United States Patent
Yoo (10) Patent No.: US 10,368,001 B2
(45) Date of Patent: Jul. 30, 2019

(54) IMAGE SENSOR CONTROLLING GYROSCOPE SENSOR AND IMAGING DEVICE INCLUDING SAME

(71) Applicant: SAMSUNG ELECTRONICS CO., LTD., Suwon-si, Gyeonggi-Do (KR)

(72) Inventor: Dong Jai Yoo, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/361,449

(22) Filed: Nov. 27, 2016

(65) Prior Publication Data

US 2017/0155843 A1    Jun. 1, 2017

(30) Foreign Application Priority Data

Nov. 27, 2015 (KR) .................. 10-2015-0167643

(51) Int. Cl.
*H04N 5/232* (2006.01)
*H04N 5/374* (2011.01)

(52) U.S. Cl.
CPC ..... *H04N 5/23267* (2013.01); *H04N 5/23258* (2013.01); *H04N 5/374* (2013.01)

(58) Field of Classification Search
None
See application file for complete search history.

(56) References Cited

U.S. PATENT DOCUMENTS

| | | | |
|---|---|---|---|
| 7,856,176 B2 | 12/2010 | Yoon et al. | |
| 7,932,924 B2 | 4/2011 | Higo | |
| 2008/0012950 A1* | 1/2008 | Lee | H04N 5/23248 348/208.99 |
| 2009/0040317 A1 | 2/2009 | Park et al. | |
| 2010/0053343 A1 | 3/2010 | Kim et al. | |
| 2011/0163166 A1* | 7/2011 | Wang | G06K 7/10722 235/472.01 |
| 2013/0044228 A1 | 2/2013 | Corey et al. | |

FOREIGN PATENT DOCUMENTS

| | | |
|---|---|---|
| JP | 2006-293131 A | 10/2006 |
| JP | 2008-283443 A | 11/2008 |
| JP | 2009-159553 A | 7/2009 |
| KR | 1020100028886 A | 3/2010 |
| KR | 1020130102929 A | 9/2013 |

\* cited by examiner

*Primary Examiner* — Mark T Monk
(74) *Attorney, Agent, or Firm* — Volentine, Whitt & Francos, PLLC (57) ABSTRACT

An image sensor includes; a pixel array including pixels providing pixel signals, a timing controller that controls exposure time for the pixels and generates a flag signal indicating a start and a stop for the exposure time, and a first connection pin configured to transfer the flag signal to a gyroscope sensor.

17 Claims, 7 Drawing Sheets

IMAGE SENSOR CONTROLLING GYROSCOPE SENSOR AND IMAGING DEVICE INCLUDING SAME

CROSS-REFERENCE TO RELATED APPLICATION

This application claims priority under 35 U.S.C. § 119(a) from Korean Patent Application No. 10-2015-0167643 filed on Nov. 27, 2015, the disclosure of which is hereby incorporated by reference in its entirety.

BACKGROUND

Embodiments of the present inventive concept relate to image sensors controlling a gyroscope sensor. More particularly, embodiments of the inventive concept relate to image sensors that more accurately compensate in real time (or on-the-fly) for image shake (i.e., camera shake) in each frame. Other embodiments of the inventive concept relate to devices incorporating this type of image sensor.

In general, as image sensor resolution increases, the size of respective pixels included in the image sensor decreases. In order to compensate for sensitivity of an image sensor in a low light environment, the frame speed of the image sensor decreases, and exposure time correspondingly increases. Under such conditions in particular, image shake (e.g., such as that induced by movement of a user's hand) may result in noticeably degraded image quality. Accordingly, some form of image stabilization providing improved image quality regardless of instantaneous movement or instantaneous moment is required. Optical correction is a technique used to prevent image shake by moving the lens of a camera including an image sensor. However, this technique is difficult to correct the image shake in real time or on-the-fly due to time constraints associated with driving the lens.

SUMMARY

An embodiment of the inventive concept is directed to an image sensor, an image sensor including; a pixel array including pixels providing pixel signals, a timing controller that controls exposure time for the pixels and generates a flag signal indicating a start and a stop for the exposure time, and a first connection pin configured to transfer the flag signal to a gyroscope sensor.

Another embodiment of the inventive concept is directed to an image sensor module including; a gyroscope sensor, and an image sensor configured to generate a flag signal enabling/disabling the gyroscope sensor. The image sensor includes; a pixel array including pixels arranged in rows extending from a first row to a last row and providing pixel signals, a timing controller that controls exposure time for the pixels and generates the flag signal indicating a start and a stop of the exposure time, and a first connection pin configured to transfer the flag signal to the gyroscope sensor.

Another embodiment of the inventive concept is directed to a mobile device including; an image sensor module, and an image signal processor configured to control operation of the image sensor module. The image sensor module includes; a gyroscope sensor, and an image sensor configured to generate a flag signal enabling/disabling the gyroscope sensor. The image sensor includes; a pixel array including pixels arranged in rows extending from a first row to a last row and providing pixel signals, a timing controller that controls exposure time for the pixels and generates the flag signal indicating a start and a stop of the exposure time, and a first connection pin configured to transfer the flag signal to the gyroscope sensor. Another embodiment of the inventive concept is directed to a method of operating an imaging device including a gyroscope sensor and an image sensor including a pixel array arranging pixels in a plurality of rows including a first row and a last row with intervening rows between the first row and last row. The method includes; providing the flag signal from the image sensor to the gyroscope sensor, starting and stopping a first exposure time for the first row, successively starting and stopping a corresponding exposure time for each one of the intervening rows, and then, starting and stopping a last exposure time for the last row, activating the flag signal in response to the starting of the first exposure time, and de-activating the flag signal in response to the stopping of the last exposure time, wherein the gyroscope sensor provides gyroscope data during only a period between the activating of the flag signal and the de-activating of the flag signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION

Certain embodiments of the inventive concept now will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings, like reference numbers refer to like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
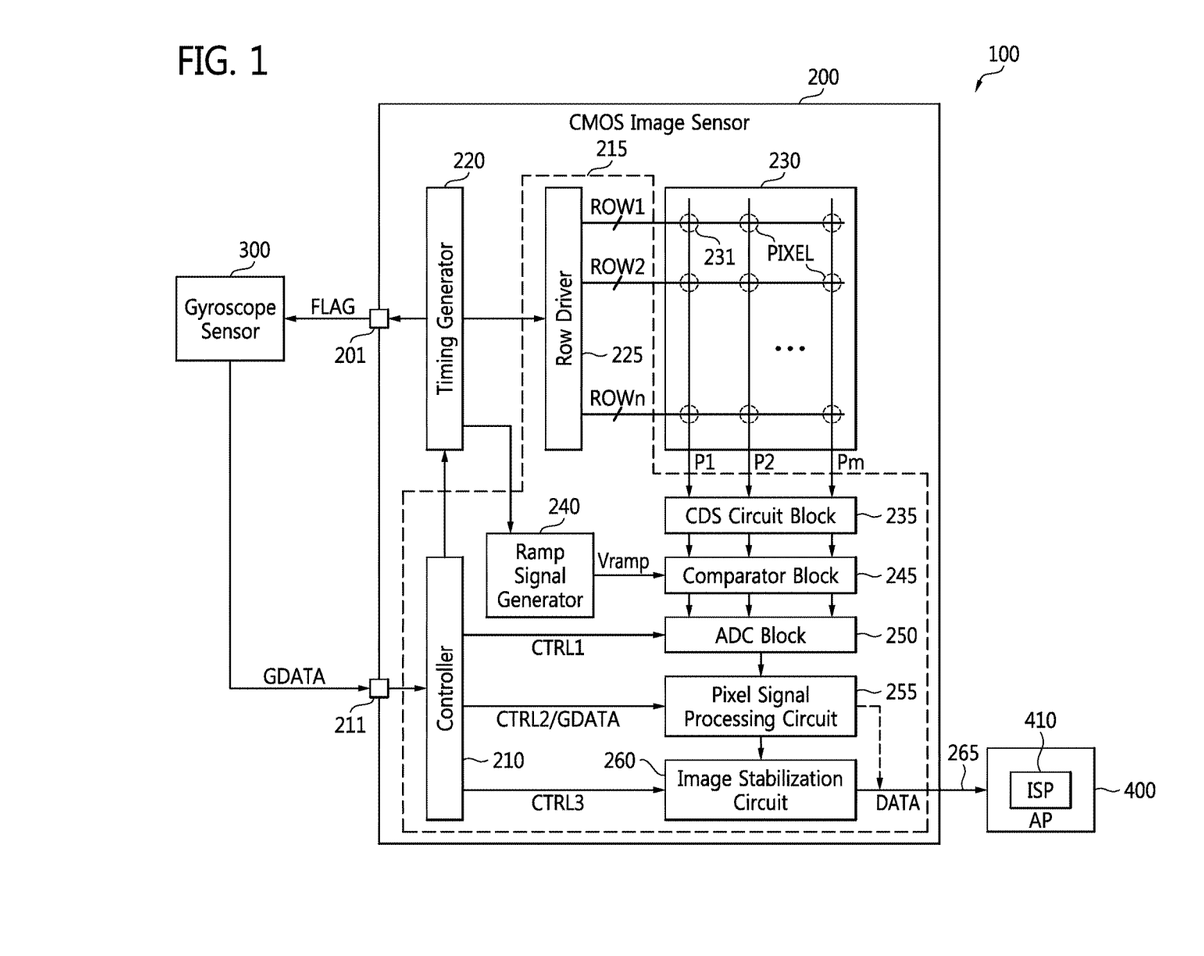
FIG. 1 is a block diagram illustrating a mobile device according to embodiments of the inventive concept.

Figure FIG. 1 is a block diagram of a mobile device 100 according to embodiments of the inventive concept. Here, the mobile device 100 is capable of processing image data (or "image") and includes a CMOS image sensor 200, a gyroscope sensor 300, and an application processor (AP) 400. This particular mobile device embodiment notwithstanding, those skilled in the art will recognize that the scope of the inventive concept is not limited to only mobile devices of this specific type and configuration, but instead, extends across a wide variety of image processing systems or imaging devices that benefit from image stabilization (e.g., image-stabilized binoculars, still cameras, video cameras, astronomical telescopes, smart phones, automotive systems, and/or security systems).

In this regard, the term "image stabilization" is generally used to refer to technology used to reduce undesired image blurring associated with motion of an imaging device during image exposure. For example, image stabilization may compensate for pan and tilt of an imaging device, where "tilt" refers to an angular movement corresponding (or equivalent) to yaw and pitch as described hereafter in relation to FIG. 7.

As will be described in different configurations, various embodiments of the inventive concept may include an image sensor and a gyroscope sensor. Collectively, these two elements may be referred to as an image sensor module, regardless of the physical configuration and operative nature of the image sensor and gyroscope sensor. In this context, an image sensor module may be configured within an imaging device.

Figure 5:
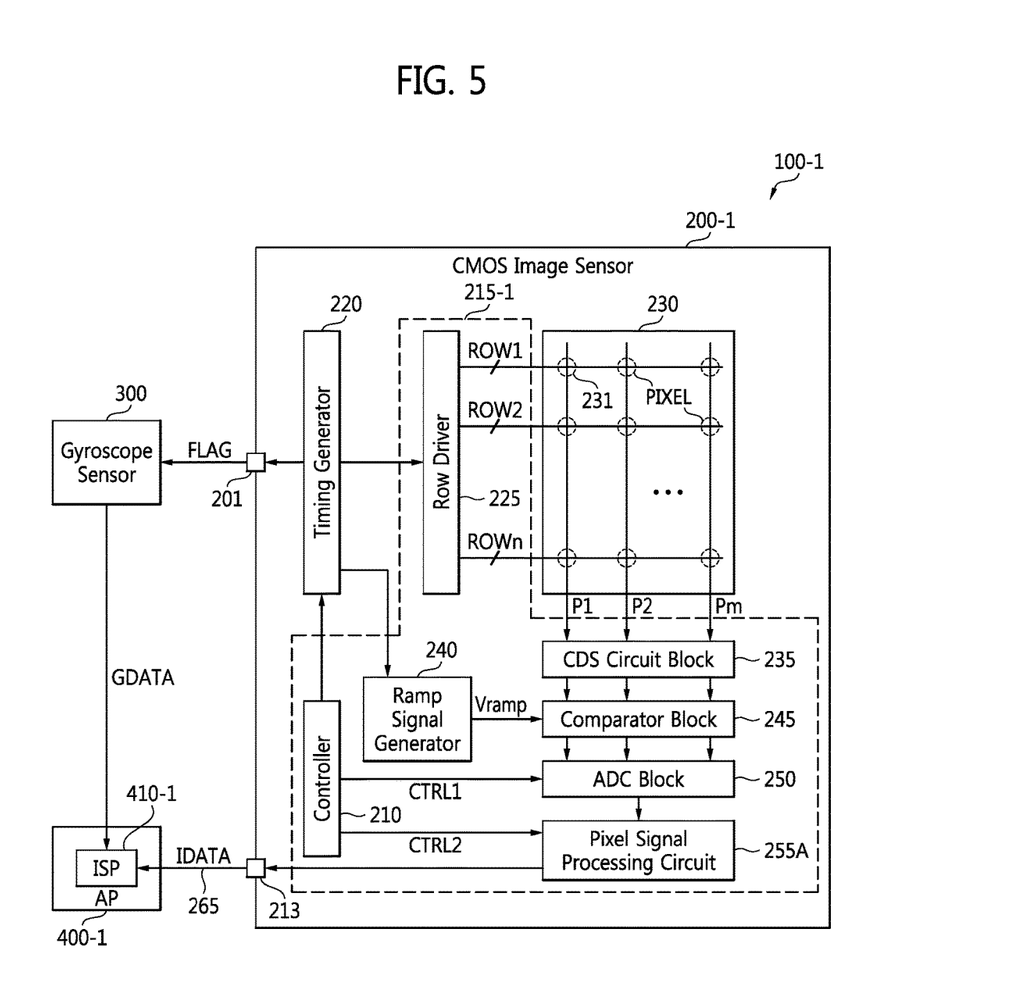
FIG. 5 is a block diagram illustrating a mobile device according to embodiments of the inventive concept.

The mobile device 100 of FIG. 1 or the mobile device 100-1 of FIG. 5 may be embodied in a mobile phone, a smart phone, a tablet PC, a personal digital assistant (PDA), an enterprise digital assistant (EDA), a digital still camera, a digital video camera, a portable multimedia player (PMP), a mobile internet device (MID), a wearable computer, an Internet of Things (IoT) device, an Internet of Everything (IoE) device, or a drone.

The CMOS image sensor 200 may refer to a chip capable of converting incident light of a specified wavelength range (hereafter, an "optical image") into corresponding electrical signals (hereafter, "image data"). The CMOS image sensor 200 of FIG. 1 is illustrated as including a first connection pin 201, a second connection pin 211, an image processing circuit 215, a timing controller 220, and a pixel array 230.

The first connection pin 201 may be used to transfer a flag signal (FLAG) to the gyroscope sensor 300, and the second connection pin 211 is used to receive gyroscope data (GDATA) provided by the gyroscope sensor 300. According to exemplary embodiments, at least one of the first connection pin 201 and the second connection pin 211 may be embodied as a general-purpose input/output (GPIO) pin.

The flag signal may control the functional operation (enabling/disabling) of the gyroscope sensor 300. The gyroscope data are data indicating movement of the gyroscope sensor 300, and may be generated (and provided) according to whether the flag signal is enabled/disabled.

According to exemplary embodiments, the image processing circuit 215 may generate image data using pixel signals P1 to Pm, where m is a natural number of three or more in response to respective pixels (PIXEL) disposed in the pixel array 230 in order to generate "output data" (DATA) that is a product of the image data and corresponding gyroscope data.

According to exemplary embodiments, the image processing circuit 215 may; (1) receive gyroscope data from the gyroscope sensor 300, (2) generate image data using the pixel signals P1 to Pm from the pixels included in the pixel array 230, (3) perform an image stabilization operation on the image data using the gyroscope data, in order to (4) generate image-stabilized data as output data. The image stabilization operation may refer to an operation of generating a clear image by compensating an image which is blurred by hand shake, image shake, or camera shake.

As will be described in some additional detail hereafter, when an imaging device does not include an image stabilization feature (like the one described hereafter in relation to image stabilization circuit 260), the imaging device may generate output data including image data (IDATA) and gyroscope data such as that shown in CASE 1 of FIG. 3. However, when an imaging device (e.g., image processing circuit 215 of FIG. 1) includes the image stabilization circuit 260, the image processing circuit 215 may perform an image stabilization operation on the image data using the gyroscope data in order to generate image-stabilized data (CIDATA) such as that shown in CASE 2 of FIG. 3. In this context, certain embodiments of the inventive concept may have the optionally provided ability to switch between the generation of different output data forms (e.g., CASE 1 and CASE 2 of FIG. 3).

In FIG. 1, the timing controller 220 may control an operation of the image processing circuit 215, where the image processing circuit 215 may include a controller 210, a row driver 225, a correlated double sampling (CDS) block 235, a comparator block 245, an analog-to-digital converter (ADC) block 250, and a pixel signal processing circuit 255. The image processing circuit 215 may further include an image stabilization circuit 260. That is, various embodiments of the inventive concept may provide the image stabilization circuit 260 internal to or external from the image processing circuit 215.

The controller 210 may be used to control (e.g.,) the operation and inter-operation of the timing controller 220, ADC block 250, pixel signal processing circuit 255, and/or image stabilization circuit 260. According to exemplary embodiments, the controller 210 may transmit the gyroscope data (GDATA) received via the second connection pin 211 to the pixel signal processing circuit 255 and/or the image stabilization circuit 260. The gyroscope data may be transferred to the pixel signal processing circuit 255 independently, or in conjunction with a second control signal CTRL2 that controls the pixel signal processing circuit 255.

The timing controller 220 may control a row driver 225 and a ramp signal generator 240 in response to, or under the control of, the controller 210. The row driver 225 may control an operation of pixels of the pixel array 230 that are disposed in respective rows in response to the control of the timing controller 220.

Figure 2:
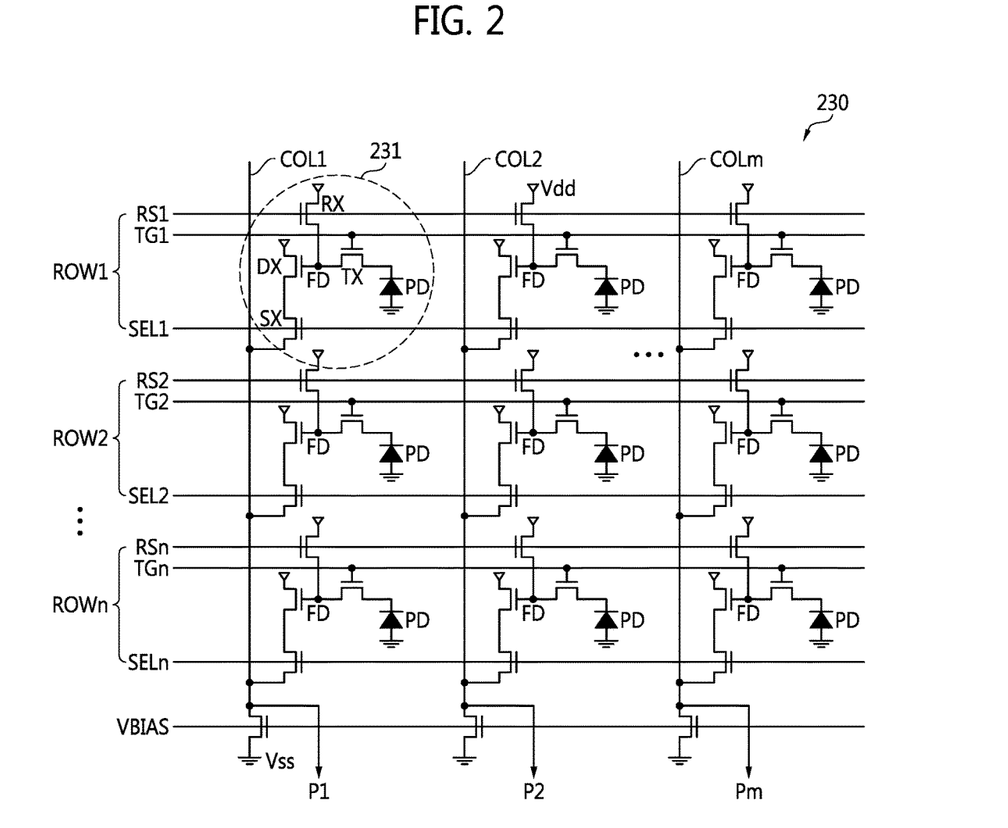
FIG. 2 is a block diagram further illustrating the pixel array of FIG. 1.

FIG. 2 is a partial circuit diagram further illustrating in one example the pixel array 230 of FIG. 1. FIG. 3 is a conceptual diagram further illustrating one approach to the generation of a flag signal indicating a start time and a stop time defining an exposure time.

Figure 3:
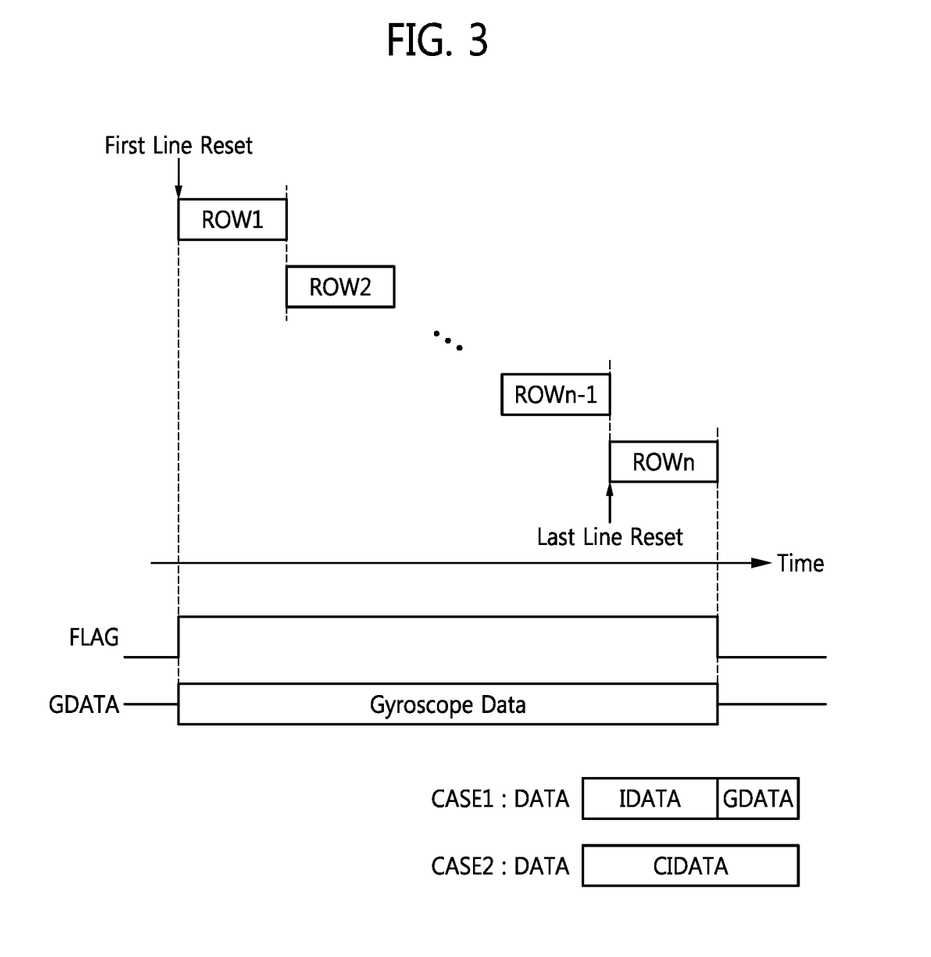
FIG. 3 is a conceptual diagram illustrating one approach to the generation of a flag signal indicating a start and a stop for an exposure time.

Referring to FIGS. 1, 2 and 3, the row driver 225 may generate first row control signals ROW1 for controlling an operation of pixels disposed in a first row, second row control signals ROW2 for controlling an operation of pixels disposed in a second row, and so forth until generating $n^{th}$ row control signals ROWn for controlling an operation of pixels disposed in an $n^{th}$ row. Moreover, the row driver 225 may generate a bias voltage (VBIAS) for controlling the operation of a bias circuit respectively disposed in each column, where each column is defined according to a respective column lines COL1 to COLm.

As shown in FIG. 2, each pixel is assumed to have the same structure and operation, as represented by the structure and operation of a pixel 231 described hereafter. Here, pixel 231 is further assumed to include a photo-electric conversion element PD, a reset transistor RX, a transfer transistor TX, a driver transistor DX, and a selection transistor SX.

In the illustrated example of FIG. 2, the reset transistor RX is connected between a power supply node supplying an operation voltage Vdd and a floating diffusion region FD, such that reset of the floating diffusion region FD in performed in response to a first rest signal RS1. The transfer transistor TX is used to transfer photo-charge from the photoelectric conversion element PD to the floating diffusion region FD in response to a first transfer control signal TG1. The driver transistor DX is connected between the power supply node and the selection transistor SX, and serves as a source follower in response to a voltage of the floating diffusion region FD. The selection transistor SX outputs an output signal of the driver transistor DX as pixel signal P1 in response to a first selection signal SEL1.

The foregoing exemplary configuration and operation results in first row control signals ROW1 that include control signals RS1, TG1, and SEL1 for controlling exposure time of pixels disposed in a first row. For example, the first transfer control signal TG1 may serve as a first exposure time control signal for controlling a first exposure time of the pixels disposed in the first row; second row control signals ROW2 that include control signals RS2, TG2, and SEL2 for controlling exposure time of pixels disposed in a second row. For example, a second transfer control signal TG2 may serve as a second exposure time control signal for controlling a second exposure time of the pixels disposed in the second row; through $n^{th}$ row control signals ROWn that include control signals RSn, TGn, and SELn for controlling exposure time of pixels disposed in an $n^{th}$ row. For example, an $n^{th}$ transfer control signal TGn may serve as an $n^{th}$ exposure time control signal for controlling an $n^{th}$ exposure time of the pixels disposed in the $n^{th}$ row.

The CDS circuit block 235 may include respective CDS circuits disposed in each of column lines COL1 to COLm. Each CDS circuit may perform correlated double sampling (CDS) on each of the pixel signals P1 to Pm and output a correlated double sampled pixel signal.

The comparator block 245 may include a comparator disposed in each column. Each comparator may compare a ramp signal (Vramp) output from the ramp signal generator 240 with a correlated double sampled pixel signal output from each CDS circuit, and output a comparison signal. The ADC block 250 may include ADC disposed in each column. Each ADC may generate digital signals corresponding to an output signal of each comparator in response to a first control signal CTRL1 output from the controller 210.

Referring to CASE 1 of FIG. 3, in response to the second control signal CTRL2 output from the controller 210, the pixel signal processing circuit 255 may generate image data (IDATA) using the digital signals corresponding to the pixel signals P1 to Pm in order to generate output data (DATA) including the image data and gyroscope data. Alternately, referring to CASE 2 of FIG. 3, the image stabilization circuit 260 may receive the image data (IDATA) and the gyroscope data (GDATA) from the pixel signal processing circuit 255, perform an image stabilization operation on the image data using the gyroscope data in order to generate image-stabilized data (CIDATA), and output the image-stabilized data CIDATA as output data (DATA).

The CMOS image sensor 200 may then transfer the output data to (e.g.,) an image signal processor (ISP) 410 included in the AP 400 via an interface 265 (e.g., a MIPI® camera serial interface).

Hence, the gyroscope sensor 300 need not directly transfer the gyroscope data (GDATA) to the ISP 410 of the AP 400, but may instead, directly transfer the gyroscope data to the CMOS image sensor 200. Accordingly, the ISP 410 of the AP 400 need not necessarily include a pin configured to directly receive the gyroscope data from the gyroscope sensor 300.

In the illustrated example of FIG. 1, the ISP 410 may not only receive and process the output data (DATA) provided by the CMOS image sensor 200, but also control the overall operation of the CMOS image sensor 200.

Figure 4:
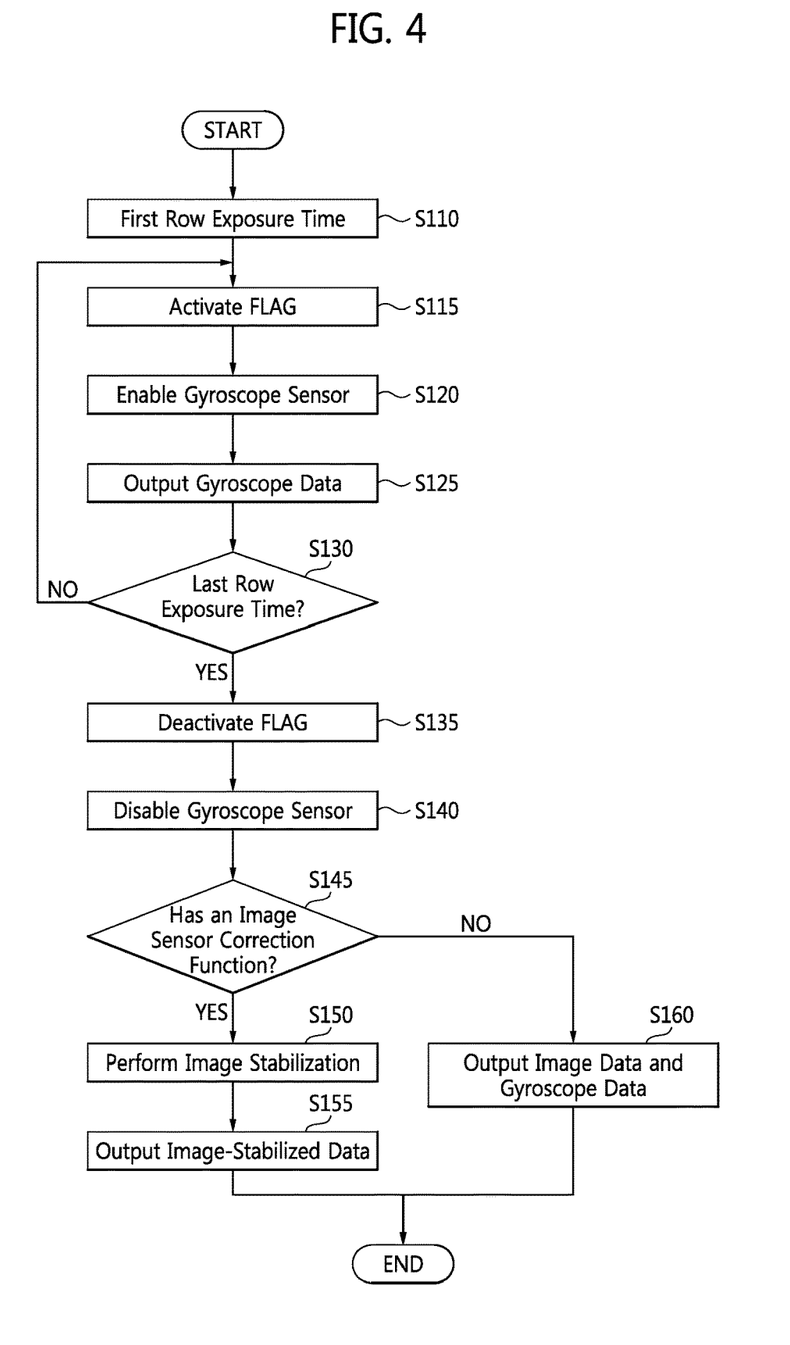
FIG. 4 is a flowchart summarizing in one example the operation of the image sensor and gyroscope sensor of FIG. 1.

FIG. 4 is a flowchart summarizing one possible example of the operation of the CMOS image sensor 200 and gyroscope sensor 300 of FIG. 1. Referring to FIGS. 1, 2, 3 and 4, the timing controller 220 may be used to control exposure time for the pixels disposed in the pixel array 230, generate a flag signal indicating a start time and stop time defining the duration of the exposure time, and transfer the flag signal to the gyroscope sensor 300 via the first connection pin 201.

As shown in FIG. 3, the start time is synchronized with the first row control signals ROW1 supplied to first pixels disposed in a first row of pixels in the pixel array 230, and the stop time is synchronized with the $n^{th}$ row control signals ROWn supplied to $n^{th}$ pixels disposed in an $n^{th}$ row (i.e., a last row) of the pixels in the pixel array 230.

The timing controller 220 may generate an activated (e.g., a logically "high" level) flag signal (FLAG) in response to the activation of a first exposure time control signal (e.g., the first transfer control signal TG1) supplied to pixels disposed in the first row, and generate a de-activated (e.g., a logically "low" level) flag signal in response to the de-activation of the $n^{th}$ exposure time control signal (e.g., the $n^{th}$ transfer control signal TGn) supplied to the pixels disposed in the $n^{th}$ row. Thus, in the foregoing example, "activation" may mean a transition from low to high and "de-activation" may mean a transition from high to low. However, these definitions may be reversed in other embodiments of the inventive concept.

The gyroscope sensor 300 is enabled in response to activation of the flag signal and is disabled in response to de-activation of the flag signal.

Referring to FIG. 4, the first exposure time for "first pixels" disposed in the first row may be controlled by operation of the timing controller 220 (S110). That is, the first pixels disposed in a first line may be reset. The timing controller 220 may activate the flag signal when the first exposure time is started (S115), and the gyroscope sensor 300 is enabled in response to the activated flag signal (S120). Thereafter, the enabled gyroscope sensor 300 may generate and provide gyroscope data the second connection pin 211 (S125).

The sequential generation of a second exposure time for "second pixels" disposed in the second row through an nth exposure time for "$n^{th}$ pixels" disposed in the $n^{th}$ row may be controlled by the timing controller 220 (successively S130=NO, until the nth exposure time).

When the generation of the $n^{th}$ exposure time is stopped (e.g., when the $n^{th}$ transfer control signal TGn is generated) after the $n^{th}$ pixels disposed in an $n^{th}$ line are reset, the timing controller 220 may de-activate a flag signal (S135). Accordingly, the gyroscope sensor 300 is disabled in response to the de-activated flag signal (S140), and the disabled gyroscope sensor 300 does not generate the gyroscope data.

Then, a determination is made as to whether or not the CMOS image sensor 200 performs a correction function. If the CMOS image sensor 200 performs a correction function (S145=YES), then the image stabilization circuit 260 is operational within the CMOS image sensor 200 such that it receives image data (IDATA) and gyroscope data (GDATA) from the pixel signal processing circuit 255, performs an image stabilization operation on the image data using the gyroscope data GDATA in real time (S150) in order to generate image-stabilized data CIDATA, and outputs the image-stabilized data as output data (DATA) in real time (S155). However, if the CMOS image sensor 200 does not perform a correction function (S145=NO), the pixel signal processing circuit 255 may generate image data (IDATA) using digital signals corresponding to the pixel signals P1 to Pm output from the pixel array 230, and generate output data (DATA) including the image data and the gyroscope data in real time (S160). The CMOS image sensor 200 may not perform a correction function if the image stabilization circuit 260, or similar circuitry/software is not present in the CMOS image sensor 200 or if the CMOS image sensor 200 is currently operating in a mode that is incompatible with a correction function.

FIG. 5 is a block diagram of a mobile device according to another embodiment of the inventive concepts. Comparing FIGS. 1 and 5, the gyroscope sensor 300 of FIG. 1 directly outputs the gyroscope data (GDATA) to the CMOS image sensor 200, but the gyroscope sensor 300 of FIG. 5 directly output the gyroscope data to an ISP 410-1 of an AP 400-1.

In this context, the mobile device 100-1 may refer to a device capable of processing image data and including the CMOS image sensor 200-1, gyroscope sensor 300, and AP 400-1. The CMOS image sensor 200-1 may refer to a chip capable of converting an optical image into corresponding image data (IDATA).

The CMOS image sensor 200-1 may include the first connection pin 201, a second connection pin 213, an image processing circuit 215-1, as well as the timing controller 220 and pixel array 230.

The first connection pin 201 may be used to transfer the flag signal (FLAG) to the gyroscope sensor 300, and the second connection pin 211 may be used to output image data (IDATA) generated by the image processing circuit 215-1 to the ISP 410-1 of the AP 400-1. The second connection pin 211 may refer to an interface for outputting the image data to the ISP 410-1 of the AP 400-1 (e.g., a MIPI® camera serial interface).

As previously described in relation to FIG. 1, the ADC block 250 may generate digital signals. A pixel signal processing circuit 255A may generate image data using the digital signals corresponding to the pixel signals P1 to Pm and transmit the image data to the ISP 410-1 of the AP 400-1 through the third connection pin 211 in response to a second control signal CTRL2 output from the controller 210.

The ISP 410-1 may receive the gyroscope data output from the gyroscope sensor 300 and the image data output from the CMOS image sensor 200-1, perform an image stabilization operation on the image data using the gyroscope data in real time, and generate image-stabilized data accordingly.

Figure 6:
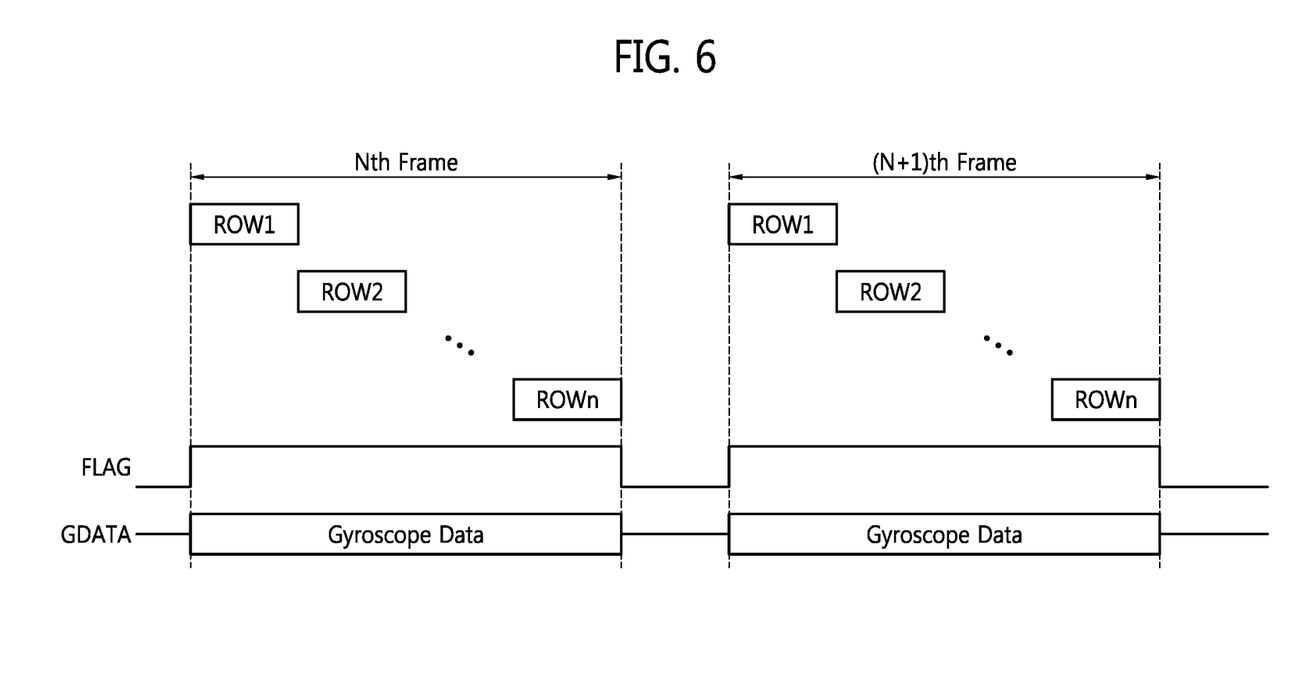
FIG. 6 is a conceptual diagram illustrating in one example the operation of the image sensor and gyroscope sensor of FIG. 5.

FIG. 6 is a conceptual diagram further illustrating in one possible example the operation of the CMOS image sensor 200-1 and gyroscope sensor 300 of FIG. 5. Referring to FIGS. 5 and 6, the timing controller 220 may generate a flag signal (FLAG) controlling (i.e., enabling/disabling) the gyroscope sensor 300 in each frame. For example, the gyroscope sensor 300 may start generating gyroscope data (GDATA) when the flag signal is activated, and stop generating the gyroscope data when the flag signal is de-activated.

This operating approach stands in contrast with related art approaches to operating a gyroscope sensor in relation to a CMOS image sensor and an application processor. And since the gyroscope sensor 300 may be synchronized with one or more flag signal(s) in various embodiments of the inventive concept in order to generate gyroscope data, power consumed by the operation of the gyroscope sensor 300 may be reduced as compared with the related art approaches.

Figure 7:
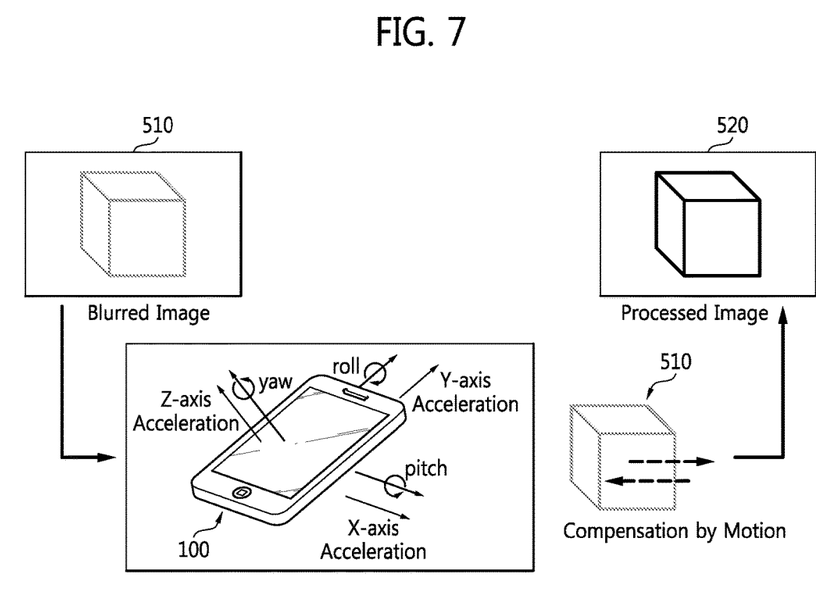
FIG. 7 is a block diagram illustrating in one example the compensation performed in the mobile devices of FIGS. 1 and 5.

FIG. 7 is a block diagram further illustrating the image shaking compensation functionality that may be performed by imaging devices consistent with the inventive concept such as the mobile devices illustrated in FIG. 1 or 5. Referring to FIGS. 1, 2, 3, 4, 5, 6 and 7, a mobile device 100 or 100-1 (collectively, imaging device 100) may include the CMOS image sensor 200 or 200-1, gyroscope sensor 300, and AP 400 or 400-1.

The CMOS image sensor 200 or the ISP 410-1 may perform an image stabilization operation on image data that suffers (e.g.,) from blurring caused image shaking) using gyroscope data GDATA in real time in order to generate image-stabilized data.

The gyroscope sensor 300 may detect a movement of (1) the gyroscope sensor 300, (2) an image sensor module equipped with the gyroscope sensor 300 and CMOS image sensor 200 or 200-1, or (3) the mobile device 100. Gyroscope data may be generated corresponding to the movement detection.

For example, the gyroscope sensor 300 may detect x-axis acceleration, y-axis acceleration, and/or z-axis acceleration, and generate gyroscope data GDATA corresponding to a result of the detection. For example, the gyroscope sensor 300 may detect pitch in an X axis direction, roll in a Y axis direction, and/or yaw in a Z axis direction, and generate gyroscope data GDATA corresponding to a result of the detection.

An image sensor for controlling an operation of a gyroscope sensor according to an exemplary embodiment of the inventive concepts may generate a flag signal synchronized with the start and stop of exposure time(s) of the image sensor, and output the flag signal to the gyroscope sensor.

Accordingly, an operation of the image sensor and an operation of the gyroscope sensor may be synchronized. The image sensor may control an output time (or timing) of gyroscope data generated by the gyroscope sensor (i.e., data that represents movement of the image sensor) using the flag signal. The image sensor may compensate for both unintended image shake(s) and intended image shake(s).

Although a few embodiments of the inventive concept have been shown and described, it will be appreciated by those skilled in the art that changes may be made in these embodiments without departing from the scope of the inventive concept as defined by the appended claims and their equivalents.

What is claimed is:

1. An image sensor comprising:
    a pixel array including pixels in first through nth rows providing pixel signals;
    a timing controller configured to control generation of exposure time for the pixels, and to generate a flag signal indicating a start and a stop of the exposure time,
    wherein the exposure time comprises sequential generation of a first exposure time for first pixels disposed in the first row of the pixel array through an nth exposure time for nth pixels disposed in the nth row of the pixel array; and
    a first connection pin configured to transfer the flag signal to a gyroscope sensor,
    wherein the timing controller is configured to enable the gyroscope sensor by activation of the flag signal and to disable the gyroscope sensor by de-activation of the flag signal, and
    wherein the start of the exposure time is synchronized with a first exposure time control signal supplied to the first pixels disposed in the first row during the first exposure time, and the stop of the exposure time is synchronized with an nth exposure time control signal supplied to the nth pixels disposed in the nth row during the nth exposure time.

2. The image sensor of claim 1, wherein the timing controller is configured to activate the flag signal in response to the first exposure time control signal and to de-activate the flag signal in response to the nth exposure time control signal.

3. The image sensor of claim 1, further comprising:
    a second connection pin configured to receive gyroscope data generated by the gyroscope sensor; and
    an image processing circuit that generates image data from the pixel signals,
    wherein the image processing circuit generates output data including the image data and the gyroscope data.

4. The image sensor of claim 1, further comprising:
    a second connection pin configured to receive gyroscope data generated by the gyroscope sensor; and
    an image processing circuit that generates image data from the pixel signals,
    wherein the image processing circuit comprises an image stabilization circuit that performs an image stabilization operation on the image data using the gyroscope data to generate image-stabilized data as output data.

5. The image sensor of claim 4, wherein at least one of the first connection pin and the second connection pin is a general-purpose input/output (GPIO) pin.

6. The image sensor of claim 4, wherein the output data comprises frames and the flag signal enables the gyroscope sensor in each one of the frames.

7. An image sensor module comprising:
    a gyroscope sensor; and
    an image sensor configured to generate a flag signal that is activated to enable the gyroscope sensor and de-activated to disable the gyroscope sensor,
    wherein the image sensor comprises
        a pixel array including pixels arranged in rows extending from a first row to a last row and providing pixel signals,
        a timing controller configured to control generation of exposure time for the pixels, and to generate the flag signal indicating a start and a stop of the exposure time,
        wherein the exposure time comprises sequential generation of a first exposure time for first pixels disposed in the first row of the pixel array through a last exposure time for last pixels disposed in the last row of the pixel array, and
        a first connection pin configured to transfer the flag signal to the gyroscope sensor, and
    wherein the timing controller is configured to activate the flag signal in response to a first exposure time control signal supplied to the first pixels of the first row during the first exposure time, and to de-activate the flag signal in response to a last exposure time control signal supplied to the last pixels disposed in the last row during the last exposure time, and
    the gyroscope sensor is enabled by the activated flag signal and is disabled in response to the de-activated flag signal.

8. The image sensor module of claim 7, wherein the gyroscope sensor generates gyroscope data in response to movement of the image sensor module, and directly transfers the gyroscope data to an image signal processor.

9. The image sensor module of claim 7, wherein the gyroscope sensor generates gyroscope data in response to movement of the image sensor module, and
    the image sensor further comprises:
    a second connection pin configured to receive the gyroscope data from the gyroscope sensor; and
    an image processing circuit that generates image data from the pixel signals, and generates output data including the image data and the gyroscope data.

10. The image sensor module of claim 9, wherein at least one of the first connection pin and the second connection pin is a general-purpose input/output (GPIO) pin.

11. The image sensor module of claim 7, wherein the gyroscope sensor generates gyroscope data in response to movement of the image sensor module, and
    the image sensor further comprises:
    a second connection pin configured to receive the gyroscope data from the gyroscope sensor; and
    an image processing circuit that generates image data from the pixel signals, and performs an image stabilization operation on the image data using the gyroscope data to generate image-stabilized data as output data.

12. The image sensor module of claim 11, wherein at least one of the first connection pin and the second connection pin is a general-purpose input/output (GPIO) pin.

13. The image sensor module of claim 7, wherein the gyroscope sensor is configured to generate gyroscope data in response to movement of the image sensor module and to directly provide the gyroscope data to the image sensor in response to the flag signal.

14. A mobile device comprising:
an image sensor module; and
an image signal processor configured to control operation of the image sensor module,
wherein the image sensor module comprises
  a gyroscope sensor,
  an image sensor configured to generate a flag signal that is activated to enable the gyroscope sensor and de-activated to disable the gyroscope sensor,
  wherein the image sensor comprises a pixel array including pixels arranged in rows extending from a first row to a last row and providing pixel signals,
  a timing controller configured to control generation of exposure time for the pixels, and to generate the flag signal indicating a start and a stop of the exposure time,
  wherein the exposure time comprises sequential generation of a first exposure time for first pixels disposed in the first row of the pixel array through a last exposure time for last pixels disposed in the last row of the pixel array, and
  a first connection pin configured to transfer the flag signal to the gyroscope sensor, and
wherein the timing controller is configured to activate the flag signal in response to a first exposure time control signal supplied to the first pixels of the first row during the first exposure time, and to de-activate the flag signal in response to a last exposure time control signal supplied to the last pixels disposed in the last row during the last exposure time, and
the gyroscope sensor is enabled by the activated flag signal and is disabled in response to the de-activated flag signal.

15. The mobile device of claim 14, wherein the gyroscope sensor is configured to generate gyroscope data that corresponds to movement of the image sensor module, and to directly provide the gyroscope data to the image signal processor.

16. The mobile device of claim 14, wherein the gyroscope sensor generates gyroscope data in response to movement of the image sensor module,
wherein the image sensor further comprises:
  a second connection pin configured to directly receive the gyroscope data from the gyroscope sensor; and
  an image processing circuit configured to generate image data from the pixel signals, generate output data including the image data and the gyroscope data, and output the output data to the image signal processor.

17. The mobile device of claim 14, wherein the gyroscope sensor generates gyroscope data in response to movement of the image sensor module,
wherein the image sensor further comprises:
  a second connection pin configured to receive the gyroscope data directly from the gyroscope sensor; and
  an image processing circuit configured to generate image data from the pixel signals, perform an image stabilization operation on the image data using the gyroscope data, generate image-stabilized data, and output the image-stabilized data to the image signal processor as output data.

* * * * *